US006175202B1

(12) United States Patent
Weyerstall et al.

(10) Patent No.: US 6,175,202 B1

(45) Date of Patent: Jan. 16, 2001

(54) CIRCUIT FOR CONTROLLING AN ELECTRICALLY OPERATED MOTOR VEHICLE DOOR LOCK OR SIMILAR

(75) Inventors: Bernd Weyerstall, Wuppertal; Bernhard Kordowski, Dortmund; Piotr Szablewski, Wuppertal, all of (DE)

(73) Assignee: Robert Bosch GmbH, Stuttgart (DE)

(*) Notice: Under 35 U.S.C. 154(b), the term of this patent shall be extended for 0 days.

(21) Appl. No.: 09/147,289

(22) PCT Filed: Jan. 9, 1998

(86) PCT No.: PCT/DE98/00057

§ 371 Date: Feb. 1, 1999

§ 102(e) Date: Feb. 1, 1999

(87) PCT Pub. No.: WO98/42939

PCT Pub. Date: Oct. 1, 1998

(30) Foreign Application Priority Data

Mar. 20, 1997 (DE) ............................................ 197 11 563

(51) Int. Cl.[7] ........................................................ H02P 1/00

(52) U.S. Cl. .......................... 318/280; 318/445; 318/443; 318/450; 318/467; 318/468

(58) Field of Search .................................... 292/201, 216; 318/280, 445, 443, 450, 467, 468

(56) References Cited

U.S. PATENT DOCUMENTS

| | | | |
|---|---|---|---|
| 4,530,185 | 7/1985 | Moriya et al. . | |
| 4,762,348 * | 8/1988 | Matsumoto | 292/201 |
| 4,968,074 | 11/1990 | Yamagishi et al. . | |
| 4,982,984 | 1/1991 | Yokota et al. . | |
| 5,295,720 * | 3/1994 | Budde | 292/201 |
| 5,525,875 | 6/1996 | Nakamura et al. . | |
| 5,944,367 * | 8/1999 | Imaizumi et al. | 292/201 |

FOREIGN PATENT DOCUMENTS

| | | |
|---|---|---|
| 42 18 177 | 12/1993 | (DE) . |
| 19546383 | 6/1996 | (DE) . |
| 0 095 988 | 12/1983 | (EP) . |
| 2 295 642 | 6/1996 | (GB) . |

* cited by examiner

*Primary Examiner*—Karen Masih

(74) *Attorney, Agent, or Firm*—Nixon Peabody LLP; David S. Safran

(57) ABSTRACT

The invention relates to a circuit for controlling an electrically activated motor vehicle door lock or the like, with a lock latch (1) and a detent pawl (2) which keeps the lock latch (1) in the closed position and with an electric motorized auxiliary closing drive (4) which is turned on after the lock latch (1) has reached a preclosing position and then moves the lock latch (1) by motor into the main closing position, there being a switch (16) which recognizes the preclosing position, especially a lock latch switch which scans the position of the lock latch (1). The structure of the circuit is especially simple in that the negative pole (18) of the auxiliary closing drive (4) is always connected to ground or negative potential and the positive pole (19) is switched and is either at the positive potential of the vehicle voltage or at ground or is floated and that there is only one switch (16) and the switch (16) is between the ground and a switch terminal (20) and causes switching of the auxiliary closing drive (4). Here it is especially feasible if the auxiliary closing drive (4) shuts off automatically when the lock latch (1) reaches the closed position, especially when the overstroke position of the lock latch (1) which is somewhat on the other side of the closed position is reached, when therefore the positive pole (19) of the auxiliary closing drive (4) is then at ground or negative potential or is open. This applies especially when the criterion for shutting off the auxiliary closing drive (4), when the closed position is reached, especially when the overstroke position of the lock latch (1) which is somewhat on the other side of the closed position is reached, is the power consumption of the auxiliary closing drive (4).

12 Claims, 3 Drawing Sheets

CIRCUIT FOR CONTROLLING AN ELECTRICALLY OPERATED MOTOR VEHICLE DOOR LOCK OR SIMILAR

BACKGROUND OF THE INVENTION

1. Field of the Invention

The invention relates to a circuit for controlling an electrically activated motor vehicle door lock or the like having a lock latch and a detent pawl which keeps the lock latch in the closed position and with an electric motorized auxiliary closing drive which is turned on after the lock latch has reached a pre-closing position and then moves the lock latch, by motor, into the main closing position, there being a switch which recognizes the pre-closing position, especially a lock latch switch which scans the position of the lock latch.

2. Description of Related Art

The subject of the invention is a circuit for controlling an electrically activated motor vehicle door lock or the like, therefore also suited for other types of locks on motor vehicles such as locks on rear doors, tailgates, or trunks. The known motor vehicle door lock which forms the point of departure has a lock latch and a detent pawl which keeps the lock latch in the closed position and an electric motorized auxiliary closing drive. The latter is turned on after the lock latch has reached a preclosing position and then moves the lock latch by motor into the main closing position. The preclosing position can be the reaching of the preliminary catch or a certain position of the motor vehicle door relative to the car body, for example with a residual gap of 6 mm. A switch which recognizes the preclosing position, especially a switch which scans the position of the lock latch, delivers a corresponding starting signal to the electric motorized auxiliary closing drive (published German patent application -A- 42 18 177).

In the aforementioned prior art the circuit is made such that the lock latch, in addition to the switch which recognizes the preclosing position, is assigned to a second switch which recognizes the closed position. When the closed position is reached and the detent pawl falls into the main catch on the lock latch, this second switch causes the electric motorized auxiliary closing drive to be turned off.

SUMMARY OF THE INVENTION

The object of the invention is to devise a circuit for a motor vehicle door lock of this type or the like, which has a simpler structure. This object is achieved by the negative pole of the auxiliary closing drive always being connected to ground or negative potential and the positive pole being switched and being either at the positive potential of the vehicle voltage or at ground or is floated and by there being only one switch, the switch being between the ground and a switch terminal and causing switching of the auxiliary closing drive.

It has been recognized in accordance with the invention that a single switch which recognizes or scans the preclosing position, optionally also by a corresponding form of the lock latch, the main closing position, is enough. This need be done only in a corresponding circuit. The configurations of the invention which use as the sole additional information on the circuit state of the switch, the amount of current flowing through the electric motorized auxiliary closing drive is especially feasible.

In the following the invention is detailed using simply one drawing which shows one embodiment.

DETAILED DESCRIPTION OF THE INVENTION

Figure 1:
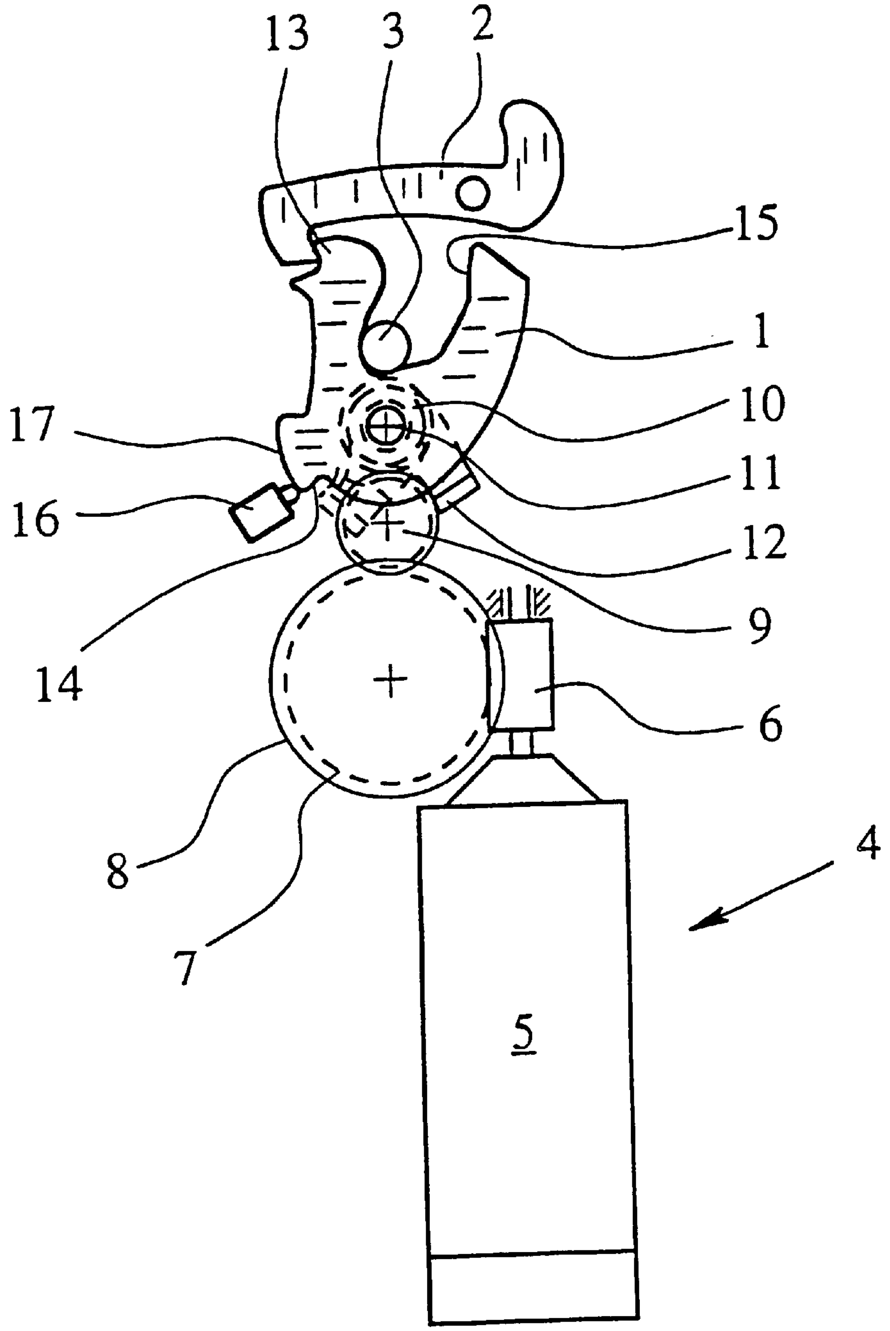
FIG. 1 shows in a schematic representation one example of an electric motor-activated motor vehicle door lock, FIG. 2 schematically shows an extremely simple circuit as claimed in the invention.

FIG. 1 shows a schematically depicted embodiment of a motor vehicle door lock or the like, in which it is to be understood that similar structures can also be used for locks on other parts of a motor vehicle body, therefore for rear doors, tailgates, or trunks.

The motor vehicle door lock shown, which therefore is intended for the side door of a motor vehicle, first of all has a lock latch 1 and a detent pawl 2 which keeps the lock latch 1 in the closed position. A locking bolt 3 is also shown as an example of the opposite element for the door lock. An electric motorized auxiliary closing drive 4 is provided which in the embodiment shown has an electric drive motor 5 which drives a worm wheel 7 via a worm 6. Via an interposed spur wheel 9 and a third spur wheel 10 a driven shaft 11 is moved which bears a lever 12 on its back end section. Coaxially to the driven shaft 11, but separate from it, is the swivel axis of the lock latch 1. The lever 12 fits behind the lock latch 1 on a driver projection 14.

FIG. 1 shows the closed position of the lock latch 1 with the detent pawl 2 which has fallen in the main catch 13. The detent pawl 2 can however also drop in the preliminary catch 15. Directly behind the preliminary catch position in the direction to the main catch position in the embodiment shown is the preclosing position of the lock latch 1 which for example corresponds to a car body distance with a residual gap of 6 mm.

The electric motorized auxiliary closing drive 4 is turned on after the lock latch 1 has reached the preclosing position. The lock latch 1 is then moved by motor into the main closing position by the lever 12 pushing the driver projection 14 on the lock latch in front of itself until the lock latch has reached the closed position shown in FIG. 1 with the detent pawl 2 dropped.

A switch 16 is shown which recognizes the preclosing position and which is a lock latch switch which scans the position of the lock latch 1 according to the preferred embodiment shown. In this embodiment it is an electromechanical microswitch with a switch plunger which is activated via a control cam 17 on the lock latch 1. The prior art includes proximity actuated switches, for example, with Hall sensors, etc.

The motor vehicle door lock shown in FIG. 1 is one in which the auxiliary closing drive 4 is automatically decoupled from the lock latch 1 when the drive energy for the auxiliary closing drive 4 is turned off or fails. This can be done by the auxiliary closing drive 4 being reset into its initial position by a spring when power to the drive motor 5 fails. This can also be done by electromagnetic coupling in the auxiliary closing drive 4 which is disconnected at the corresponding instant. The latter has the further advantage that emergency interruption of the chain of dynamic effect can be achieved with the drive running. To do this reference should be made to a parallel patent application which is being filed at the same time.

Figure 2:
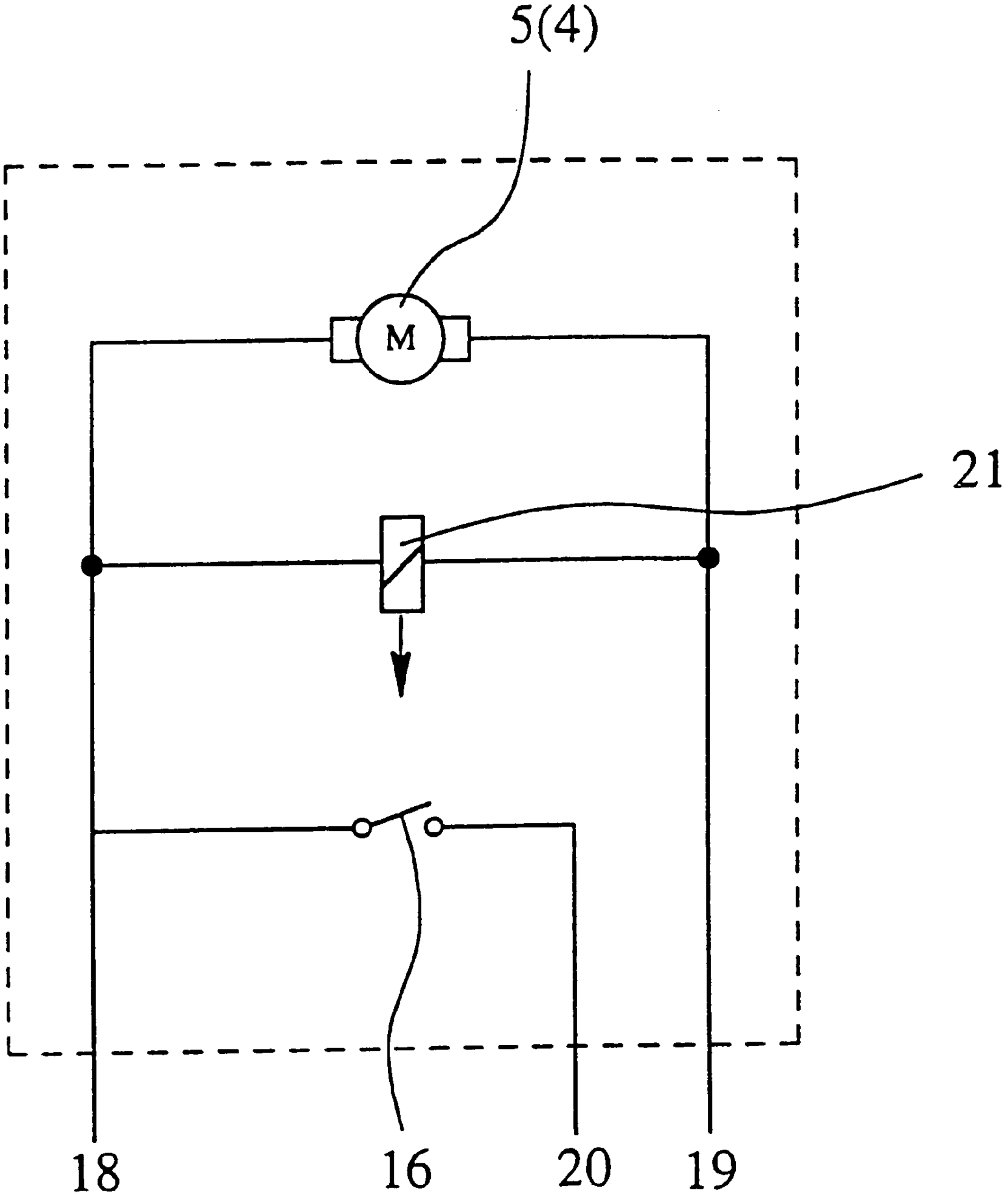

FIG. 2 shows a circuit of extremely simple structure for controlling the electrically actuated motor vehicle door lock shown in FIG. 1 by way of example. It is shown that the negative pole 18 of the auxiliary closing drive 4 or the electric drive motor 5 of the auxiliary closing drive 4 is connected to ground or negative potential and the positive pole 19 is switched and is either at the positive potential of the vehicle voltage or at ground or is floated. The switch 16 is between the ground and a switch terminal 20. The aforementioned, optional electromagnetic clutch is also entered here, without the need for it to be further explained.

The embodiment shown illustrates that the switch 16 is made as a make contact, therefore closes when the preclosing position is reached and connects the switch terminal 20 to ground.

FIG. 1 illustrates that the switch 16 in the preferred embodiment shown switches back when the lock latch 1 reaches the closed position, but preferably as shown when an overstroke position of the lock latch 1 which is somewhat on the other side of the closed position is reached.

As has been explained above, as in the embodiment shown, a continuous control cam 17 can control the switch 16. The switch 16 can however also be controlled by two operating pulses and can retain its circuit state between the operating pulses. This is a control technique which can be used for proximity actuated switches.

According to another preferred embodiment, it is provided that the auxiliary closing drive 4 shuts off automatically when the lock latch 1 reaches the closed position, especially when the overstroke position of the lock latch 1 which is somewhat on the other side of the closed position is reached, that therefore the positive pole 19 of the auxiliary closing drive 4 is then at ground or negative potential or is open.

According to the teaching preferred in this embodiment it is provided that the criterion for shutting off the auxiliary closing drive 4 when the closed position is reached, especially when the overstroke position of the lock latch 1 which is somewhat on the other side of the closed position is reached, is the power consumption of the auxiliary closing drive 4.

This monitoring of the power consumption of the electric drive motor 5 of the auxiliary closing drive 4 and evaluation of this power consumption in the control electronics can be done very easily with current electronics.

In this embodiment it is finally provided that the switch 16 switches back when the overstroke position of the lock latch 1 is reached, and when the closed position of the lock latch 1 is reached, turns on again, without a repeated operating process taking place on the positive pole 19 of the auxiliary closing drive 4. This corresponds to the representation with the continuous control cam 17.

Figure 3:
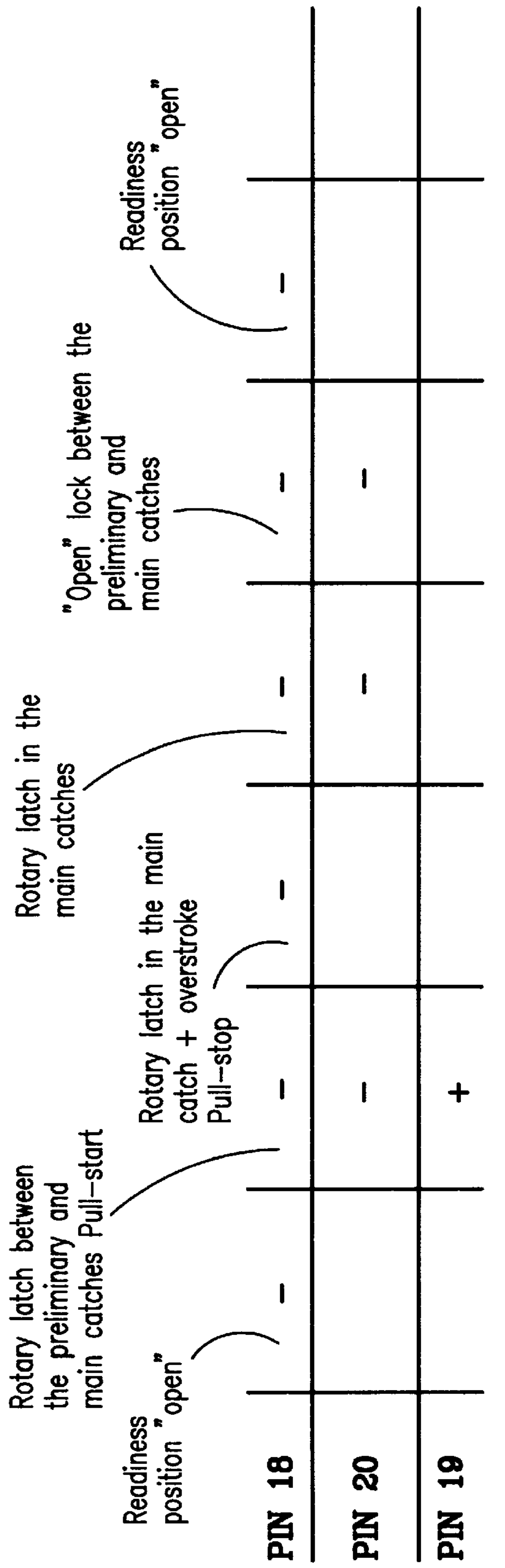
FIG. 3 shows the states of the terminals in FIG. 2 in the different operating states.
Figure 4:
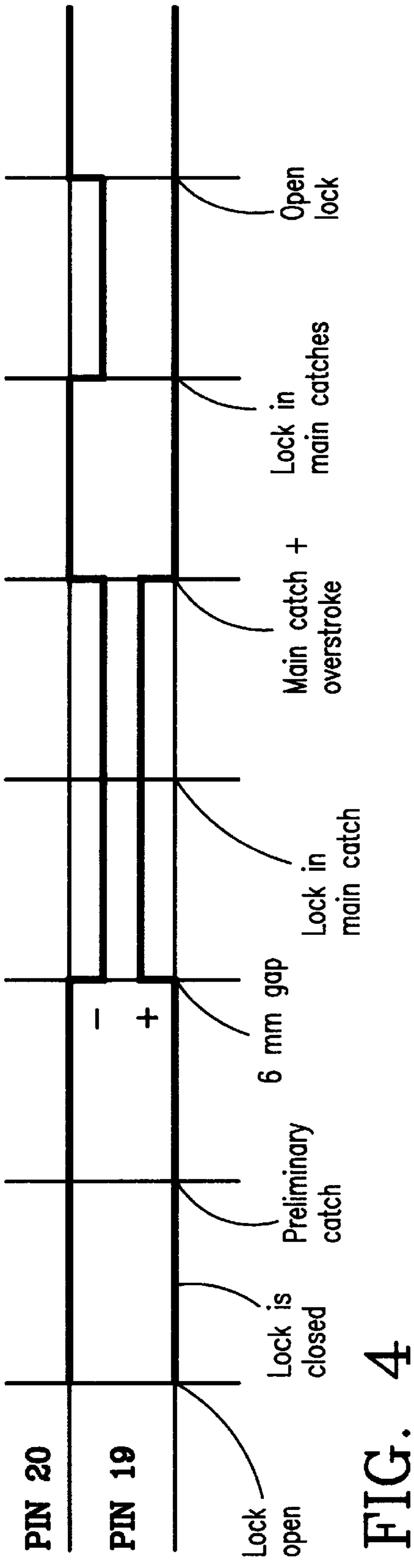
FIG. 4 shows a circuit diagram.

For the preferred embodiment shown, FIG. 3 shows the potentials on the terminals 18, 19, 20 as on the negative pole 18, the positive pole 19 and on the switch terminal 20 for the different phases of actuation of the motor vehicle door lock. Accordingly FIG. 4 shows the behavior of the potential on the switch terminal 20 and the positive pole 19.

Within the framework of the claims, modifications of the circuitry shown above are of course easily possible. The system can self-train; this however need not be farther explained here.

What is claimed is:

1. Circuit for controlling an electrically activated motor vehicle door lock comprising a lock latch and a detent pawl means for keeping the lock latch in a closed position and an electric motorized auxiliary closing drive for moving the lock latch into a main closing position, and actuating means for turning on the auxiliary closing drive after the lock latch has reached a pre-closing position, wherein said control circuit comprises only a single switch, said single switch recognizing the pre-closing position; wherein a negative pole of the auxiliary closing drive is always connected to a ground or negative potential and a positive pole of the auxiliary closing drive is switched and is either at a positive potential of the vehicle voltage, at ground or floated; and wherein said single switch is between the ground and a switch terminal and causes switching of the auxiliary closing drive.

2. Circuit as claimed in claim 1, wherein the switch is a lock latch switch which scans the position of the lock latch.

3. Circuit as claimed in claim 1, wherein the switch is made as a make contact which closes when the pre-closing position is reached and connects the switch terminal to ground.

4. Circuit as claimed in claim 3, wherein means for switching back the switch when the lock latch reaches the closed position is provided.

5. Circuit as claimed in claim 3, wherein means for switching back the switch when the lock latch reaches an overstroke position which is past the closed position is provided.

6. Circuit as claimed in claim 1, wherein the auxiliary closing drive has shut off means for automatically shutting off the auxiliary closing drive when the lock latch reaches the closed position, the positive pole of the auxiliary closing drive then being at ground, negative potential or open.

7. Circuit as claimed in claim 1, wherein the auxiliary closing drive has shut off means for automatically shutting off the auxiliary closing drive when an overstroke position of the lock latch which is past the closed position is reached, the positive pole of the auxiliary closing drive then being at ground, negative potential or open.

8. Circuit as claimed in claim 7, wherein said shut off means utilizes the power consumption of the auxiliary closing drive as a criterion for shutting off the auxiliary closing drive when the overstroke position of the lock latch is reached.

9. Circuit as claimed in claim 6, wherein said shut off means utilizes the power consumption of the auxiliary closing drive as a criterion for shutting off the auxiliary closing drive when the closed position of the lock latch is reached.

10. Circuit as claimed in claim 3, wherein means are provided for switching back the switch when an overstroke position of the lock latch is reached and for turning the switch back on when the closed position of the lock latch is reached without a repeated operating process taking place on the positive pole the auxiliary closing drive.

11. Circuit as claimed in claim 3, wherein means are provided for switching back the switch when an overstroke position of the lock latch is reached and for turning the switch back on when the closed position of the lock latch is reached without a repeated operating process taking place on the positive pole the auxiliary closing drive.

12. Circuit as claimed in claim 3, wherein means are provided for switching back the switch when an overstroke position of the lock latch is reached and for turning the switch back on when the closed position of the lock latch is reached without a repeated operating process taking place on the positive pole the auxiliary closing drive.

* * * * *